(12) United States Patent
Melcher et al.

(10) Patent No.: US 8,964,279 B2
(45) Date of Patent: Feb. 24, 2015

(54) TRANSPARENT ELECTRODE

(75) Inventors: Martin Melcher, Herzogenrath (DE);
Michael Labrot, Aachen (DE); Benno Dunkmann, Liege (BE); Philippe Letocart, Raeren (BE); Bernhard Reul, Herzogenrath (DE); Karl-Josef Ollfisch, Roetgen (DE); Marc Maurer, Saint Jean Aux Bois (FR)

(73) Assignee: Saint-Gobain Glass France, Courbevoie (FR)

( * ) Notice: Subject to any disclaimer, the term of this patent is extended or adjusted under 35 U.S.C. 154(b) by 181 days.

(21) Appl. No.: 12/377,676

(22) PCT Filed: Jul. 25, 2007

(86) PCT No.: PCT/FR2007/051722
§ 371 (c)(1),
(2), (4) Date: Feb. 17, 2009

(87) PCT Pub. No.: WO2008/020141
PCT Pub. Date: Feb. 21, 2008

(65) Prior Publication Data
US 2010/0200286 A1 Aug. 12, 2010

(30) Foreign Application Priority Data

Aug. 16, 2006 (DE) .......................... 10 2006 038 347
Sep. 27, 2006 (DE) .......................... 10 2006 045 514

(51) Int. Cl.
*G02F 1/153* (2006.01)
*G02F 1/15* (2006.01)
*G02F 1/155* (2006.01)

(52) U.S. Cl.
CPC ........ *G02F 1/155* (2013.01); *G02F 2001/1555* (2013.01); *H05B 2203/002* (2013.01); *H05B 2203/016* (2013.01)
USPC ............ 359/271; 359/265; 359/268; 359/896

(58) Field of Classification Search
CPC ........... G02F 1/15; G02F 1/155; G02F 1/163; H05K 1/0274; H05K 1/097; H05K 1/03; H05K 1/09; H05K 2201/0108; H05K 3/02
See application file for complete search history.

(56) References Cited

U.S. PATENT DOCUMENTS

| | | |
|---|---|---|
| 3,947,837 A | 3/1976 | Bitterice |
| 4,772,760 A | 9/1988 | Graham |
| 4,932,755 A | 6/1990 | Holdridge et al. |

(Continued)

FOREIGN PATENT DOCUMENTS

| | | |
|---|---|---|
| EP | 0 364 247 | 4/1990 |
| EP | 1 850 353 | 10/2007 |

(Continued)

*Primary Examiner* — Dion R Ferguson
(74) *Attorney, Agent, or Firm* — Oblon, Spivak, McClelland, Maier & Neustadt, L.L.P.

(57) ABSTRACT

An electrode is produced on a rigid or flexible support substrate, including a grid network of very fine electrically-conductive lines with nodes and links, to produce a diffraction pattern, as much as possible in an arc shape, in the light transmitted and that results in an absence of high-level optical impacts. The grid network may in addition be produced without preferential direction with a number of three lines joining up at each node and/or with conductive sections extending in the shape of an arc or in wave form between the nodes.

13 Claims, 5 Drawing Sheets

(56) References Cited

U.S. PATENT DOCUMENTS

| | | | |
|---|---|---|---|
| 5,025,344 A * | 6/1991 | Maly et al. | 361/88 |
| 6,785,036 B1 * | 8/2004 | Berneth et al. | 359/271 |
| 2002/0005977 A1 * | 1/2002 | Guarr et al. | 359/265 |
| 2004/0100676 A1 | 5/2004 | Fanton et al. | |
| 2005/0252908 A1 * | 11/2005 | Weiss | 219/522 |
| 2006/0081581 A1 * | 4/2006 | Odeh | 219/203 |
| 2006/0103911 A1 * | 5/2006 | Baumann et al. | 359/265 |
| 2007/0264530 A1 | 11/2007 | Takada et al. | |

FOREIGN PATENT DOCUMENTS

| | | |
|---|---|---|
| FR | 2 821 937 | 9/2002 |
| WO | 2006 040989 | 4/2006 |

\* cited by examiner

TRANSPARENT ELECTRODE

CROSS-REFERENCE TO RELATED APPLICATIONS

The present application is the U.S. counterpart of WO 2008/020141, and claims priority to German Application No. 10 2006 038 347.8 filed on Aug. 16, 2006, and German Application No. 10 2006 045 514.2 filed on Sep. 27, 2006, the entire contents of each of which are hereby incorporated herein by reference.

The invention relates to a transparent electrode with the characteristics from the preamble of patent claim 1.

From document WO 99/40 481 A1, an electrochromic system is known that comprises at least one transparent electrode, which electrode is designed as an aperiodic grid network with a high conductivity.

Electrodes which allow a very rapid commutation of the electrically controllable components that they supply are the subject of high demand. The electrically controllable components may include, not only electrochromic functional elements, as mentioned above for example, but also electroluminescent functional elements, which may be controlled over a large area or by pixel. Such elements are often used for the display or representation of information and images (displays, display screens and the like).

Other known uses of such transparent electrodes are for example electrical heating systems and/or antennae systems and even other systems.

For most of these functions, a prior condition is a very high electrical conductivity or, in other words, a very low surface resistance of the transparent electrode. Another condition is also systematically required when the electrode is integrated into a glass substrate for a transparent window, whether this is in a building or in a vehicle, namely to minimize the optical impact to be perceived by the human eye which is caused to blink on account of the substrate.

The use of such transparent electrodes is also known for absorbing electromagnetic radiation or protecting, from the latter, the users of a screen. In this case also, the electrodes must of course reduce as much as possible any obstacle to the passage of the light rays. On the other hand, regarding the objectives of the protection, recourse to electrodes that conduct electricity continuously is not an absolute necessity (see document DE 10 2004 038 448 B3).

In the particular context of windshields which may be heated, two base structures exist to date in the prior art. One of these solutions uses transparent conductive layers having a homogeneous surface, which however give rise to high costs in order to allow them to be supplied with energy by the onboard electrical system due to their relatively high surface resistance (between 2 and 4 ohms per unit area), (on this subject, see document DE 10 2004 050 158 B3). Such homogeneous layers are not very attractive from an esthetic viewpoint. The other solution concerns very fine wires, usually tungsten wires, encapsulated in the plastic lamination interlayer of the laminated substrates. In order that the optical impact created by these wires is less troublesome, one common practice, that has been applied for a long time, consists in encapsulating them, with or without regular waviness, in the lamination interlayer (on this subject, see document EP 443 691 B1).

The two systems are generally connected to the electrical supply voltage using strip electrodes having low impedance at the side edge.

To be exhaustive, there is a third system, in particular heating a substrate comprising conducting tracks printed (by screen-printing) with heating, which due to their optical impact only find a use in rear windows. The tungsten wires mentioned above have an even greater fineness than the already very fine lines which may be produced by screen-printing machines, even though significant progress has been made in improving the width of the conducting tracks (DE 200 19 445 U1).

The prior art as mentioned in the introduction, WO 99/40 481 A1, already has the objective of providing an efficient electrode, of which the optical impact created is very reduced, with a very low-impedance conductive material, and also proposes in one embodiment to create an aperiodic network which is described with a physical model. The grid may be applied to rigid or flexible substrates (windows, thin films). According to this prior art, the aperiodicy of this grid is mainly achieved by deforming a regular grid, in that with respect to the model, four tension springs of different stiffnesses are connected to each node under conditions at the limits determined beyond the minimum and maximum gaps between two neighboring nodes.

With this pattern, the formation of moiré effects over two grid structures superposed in parallel is prevented and, as it is asserted, a created optical impact that is lower than in the case of periodic grids results therefrom. At the same time, it is indicated that the surface effect of this electrode is satisfactory and is free from homogeneity defects at the moment of switching the electrochromic layer.

The object of the invention is to provide another transparent electrode with a conductive grid structure, where a high transparency and therefore a low degree of surface covering are combined with a created optical impact that is as small as possible.

This object is achieved according to the invention with the features of patent claim 1 and the other independent patent claims 2 and 3. The features of the dependent claims offer advantageous improvements in the invention.

The transparent electrode according to the invention is manufactured from a metal (preferably copper) grid on a suitable substrate, whether this is a glass or plastic substrate or a plastic (PET) film, using a deposition and removal process, preferably by optical lithography. Depending on the type of grid structure, the manufacture equally from individual wires, bent in a way that conforms to the proposed structure is considered.

The metal grid therefore represents an electrically-conductive structure which is suitable for a large number of different uses, but especially which is particularly suitable for integration in transparent window substrates.

In the final state, it may be combined by laminating according to a known manner between two glass or rigid plastic substrates, where appropriate together with yet other functional layers, regarding which details will be given later on in the description.

The conducting tracks of the grid have a width of around 10 μm, furthermore they cannot be perceived by the human eye due to the viewing distance. A layer of dark lacquer is preferably applied between the substrate sheet and the metal conducting lines so as to further improve the effect produced optically or to further reduce the optical impact to be perceived.

The residual metal surface (at a distance from the substrate) may in addition be colored to make it blacker or in a darker color using a surface treatment.

As one particular characteristic, the production of the grid according to the invention uses a special grid structure, which may be modified according to several variants, in order to prevent prism or diffraction patterns (which may be rendered optically in the form of "colored stars" or "flickering phenomena" and which are unavoidable in the case of regular patterns, in particular when they comprise linked outlines delimited by right angles and straight lines).

A general formulation may be printed in such a way that a (random) equipartition of the directions of all of the line segments (0° to 180°) is produced inside the grid structure, which equipartition, in the ideal case, overall causes a diffraction pattern in the form of a circle at each desired point in the grid structure.

The expression "diffraction pattern" is understood here to mean the effect resulting from when the light is diffracted at the "edges" of each line and when the human eye receives a definite impression of glare or in any case, an optical impact is caused.

Unlike the prior art mentioned in the preamble, it is possible to envisage disordered structures insofar as only three lines join up to each node. One advantage of such a pattern based on a three-component node lies in the fact that the angles, respectively inscribing between two conductive sections at the nodes, are greater, and in any case on average are greater in a random pattern. Therefore, the production is simplified because it is possible to construct corners with a better precision and the electric field intensity peaks are avoided.

Regular structures may be envisaged with the difference with regards to the prior art that the linkage lines oscillate in an arc shape between the nodes, where they can selectively comprise curves in one direction only or equally adopt a path in a wavy shape.

In the latter case, preferred embodiments are grid lattices combined from quarter-circle segments or from third-circle segments. The first are also suitable for the aforementioned manufacture from distinct bent metal wires; the second will follow the said aforementioned rule above according to which only three lines join up at each node.

In order to improve the colored structure of the diffraction circles in the white direction (and thus to also reduce the optical impact created relative to the light normally recognized as white), it is furthermore possible to modify the intensity of the conductors randomly or systematically (for example between 10 and 20 µm), while being sure in any case to preserve the optical masking.

In particular, in the disordered pattern mentioned above, the thicknesses of the wires may be adapted so that the distribution of the current is more homogeneous and that at the same time the diffraction pattern is toned down in color. The process of manufacture by optical lithography enables a faithful reproduction of the "random" structures once optimized. The optimization itself may be carried out by a computer using simulation programs.

For the use in windshield substrates having a high inclination, the grid is preferably extended in the vertical direction so that the grid distances relative to the "observation direction" remain regular in the perpendicular projection.

In the "heating glass", therefore in substrates for windows which may be heated electrically, the electrode is used, where appropriate, without additional function, simply as a heating resistor. During the application of a voltage to two electrical connectors (busbars) 20 and 22 applied to opposite sides, heating (deicing, demisting) of the substrate is started. Such applications may of course also be used for heated skylights and for solar cells in order to make snow disappear. Such an embodiment for a windshield is shown in FIG. 6.

Advantages or particular possibilities are offered within the scope of the embodiment according to the invention in that:

in one application for heating an automotive substrate, the mesh opening of the grid structure may be designed so that the desired heating power (around 6 $W/dm^2$) is achieved during the application of an onboard voltage (12 to 14 volts DC). In this case, it will be possible to apply the electrical conductors (busbars) either on the narrow sides of the substrate (thus a smaller mesh opening of the grid may be chosen so as to make it even less visible), or on the lengthwise sides of the substrate (thus a larger mesh opening of the grid may be chosen, so as to improve the light dispersion and transmission values);

the grid is transparent to infrared radiation and, for this reason nothing obstructs an onboard camera;

in comparison with wire heating, the reduced gap between conductors (=>more homogeneous heat distribution) considerably reduces the flickering effect;

the more homogeneous heat distribution also makes it possible to use plastic substrates; and the grid may be combined with a layer for solar control or that reflects infrared radiation, without the minimum accepted value for the light transmission being exceeded.

In particular, in the case of manufacturing the grid on a substrate by means of an optical lithography process or a similar process, there are the additional possibilities that make it possible to:

modify the mesh opening, beyond the height of the substrate in order to be able to obtain homogeneous heating even in the case of a trapezoidal surface or to distribute the power in a targeted fashion;

use the metal grid as an antenna due to the targeted discontinuities (slits);

increase the density of the grid applied and/or eliminate the mesh opening of the grid applied in the etching zones in proximity to the frame of a window pane and, if necessary, replace the screen printing which is generally black at the edges, insofar as the conditions at the limit such as the electrical insulation and similar criteria are taken into account and are satisfied;

gradually increase the density of the grid toward the upper edge so that it can serve as an integrated anti-glare filter, also denoted as a "sun-visor strip"; and in accordance with the process, choose the color of the lacquer between the grid and the substrate or of the PET film independently of the other surfaces, so that the color impression from the outside can be chosen independently of the transparency seen from the inside.

For manufacturing such configurations, flat, tinned copper conductors are preferably used as electrical conductors in a manner known "per se". These may be deposited directly by soldering using a soldering tool or be simply fixed (by spots of adhesive or adhesive tapes, conductive adhesive agents, spot welds), then be welded inductively after lamination. Contacting methods of another type, such as ultrasonic welding or induction welding may of course also be used. Regarding brazing and other contacting methods, there are material pairings that are much more advantageous than the tungsten wires which are known as supplying welding results that are not very satisfactory. Similarly, relative to the known thin-film systems, the grid obtained by optical lithography has a better resistance during the contacting and is therefore less fragile to damaging of the contact surface. In the region of the connections of the electrical conductors (busbars), it is necessary to remove a surface layer made of blackening, obscuring and electrically nonconductive metal, if not these regions must be covered before the surface treatment.

In principle, as has already been mentioned, such an electrically conductive grid has a protective function against given (high-frequency) electromagnetic (radio) waves. In the case where a transmission of such waves would be proved necessary for certain electronic equipment, which operate with radio waves (GPS, toll payments, etc), a communication window can be cleared by removing a cutout in the PET film deposited over the grid. In order to prevent air inclusions, a PET film 30 of the same thickness, without a grid, may be deposited in the space left free, as shown in FIG. 8.

Another variant would consist in providing, on the substrate, a free space (without grid) in the grid arrangement.

These two means are however already known in the construction of vehicle windshields which are equipped with an electrically conductive coating covering the whole surface.

For corrosion protection, an edge of around 1 to 2 cm is left free. This is carried out either by resizing the whole of the PET film+grid (when the metal grid goes right up to the edge of the film) or by choosing the grid arrangement so as to leave a free edge on the PET film, the PET film itself extending however to the edge of the glass, or else the grid extends to the edge of the PET film, but is interrupted along a circumferential line (for example by means of laser application).

When the PET film does not have a cutout either for corrosion protection or for the communication window, its thickness may be chosen (for example, 125 µm instead of the usual thickness of 50 µm), which would produce accentuated radii of curvature at the edge of the substrate.

When no element specific to the substrate (communication window, edge left free) is provided in the arrangement of the grid, this may be produced in the form of an endless strip. In particular, when it is produced by optical lithography, it is not necessary to provide a photomask for each type of substrate. The costs are therefore reduced.

When the grid arrangement does not provide any element specific to the substrate, the grid may be produced either sheet by sheet or as an endless strip (roll) with shapes aligned end to end.

The industrial production as an endless strip (roll) is easier; in particular, it simplifies the manufacture of a prelaminate (PVB+PET/copper+PVB) in a continuous roll manufacturing process, in which the deposition of the electrical conductors must however be carried out beforehand. Once the film is manufactured in this way, it can then be cut up.

When the metal grid is used for contacting functional layers (electrochromy, electroluminesence, flat lamps, organic light-emitting diodes (OLEDs), aerial), at least two embodiments are again possible:
  capacitive contacting: the metal grid is applied to the glass substrate with PVB as an adhesive intermediate layer with the functional layer, so as to prevent any direct electrical (galvanic) contact;
  the functional layer is applied to the functional PET film of the metal grid instead of being applied to the glass substrate in order to have a direct electrical contact; and
  the functional layer is separate on the grid applied to the glass or plastic substrate; thus here too there is direct electrical contact.

Relative to the transparent layers, for example made of ITO (indium tin oxide), the major advantage of the grid structure presented here lies in the extremely low level of (surface) ohmic impedance ($>0.03\Omega/\square$) for better light transmission ($>0.90\%$).

In an application as a transparent current supply for certain aggregates, the grid may quite simply replace part of the cable or be used for the contact and supply of current for the electronic elements integrated in the substrate (displays, sensors, luminous bodies, etc.).

Finally, other applications in alarm systems, for example for failure identification (closed circuit, signal during a power outage) are also imaginable.

Furthermore, it is possible to combine the grid structure according to the invention with "pure" full-area deposition, which may for example be used to increase the solar control (infrared reflection) of the window substrate in its assembly. Such a coating may be in direct contact with the grid structure, for example between the grid structure and the substrate or be separated from the substrate by the grid structure. It may also be positioned in a completely different plane of a laminated substrate, as shown in FIG. 7, which shows substrates S1 and S2 connected to electrode 3 by bonding layers 6.

Other details and advantages of the subject of the invention will emerge from the drawing of the exemplary embodiments and its detailed description below.

In a simplified representation, which is not to scale, and according to one cutout, the following can be seen in:

FIG. 1, a cutout from a first embodiment of a transparent electrode or of an electrically conductive surface structure from a line grid, of which the lines are produced as quarters of a circle so that, in the presence of high regularity, a refraction pattern of the light can all the same be defined in the desired form;

FIG. 2, a cutout from a second embodiment with a line grid, of which the lines extending each time between two nodes are produced as thirds of a circle;

FIG. 3, a cutout from a second embodiment with a line grid having no preferred direction;

FIG. 4, a schematic cross section taken through an electrode according to the invention;

FIGS. 5a and 5b, a juxtaposition of two refraction patterns of point light sources—light transmitted on a regular rectangular grid according to the prior art and on a grid configured according to the invention;

Figure 1:
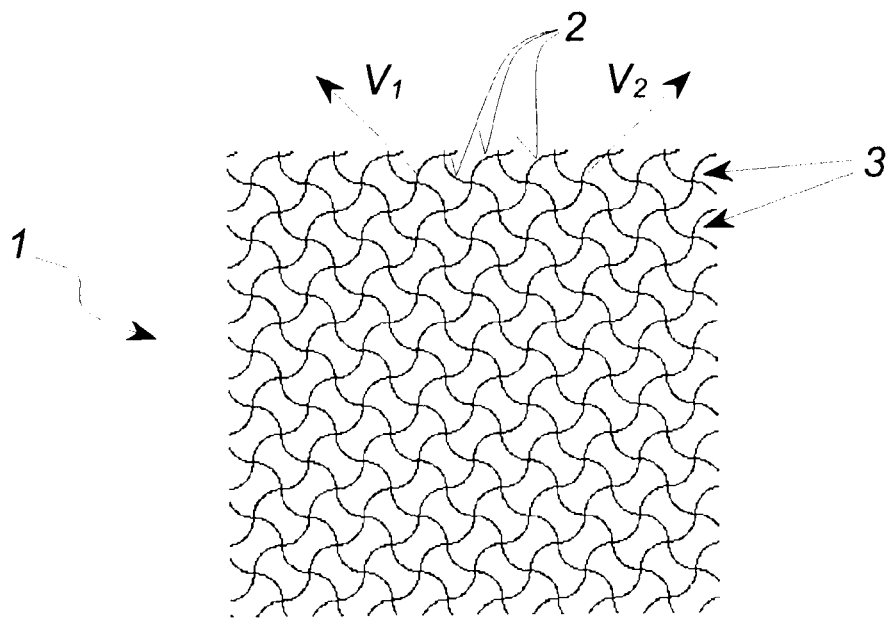

According to FIG. 1, a transparent electrode 1 is formed from a grid of fine (wavy) lines 2 which extend along two preferential directions with an angle of one relative to the other represented by oblique arrows pointing toward the outside $V_1, V_2$. The angle here is a right angle, this is not however obligatory.

These lines, which cross respectively at the node 3, are applied to a transparent substrate, such as a glass or plastic substrate or a plastic film, using a suitable process with a line thickness as reduced as possible, for example via optical lithography. They are composed of a material having a good quality of electrical conduction, for example based on metallic copper, silver or other materials. The particular advantage of this embodiment lies in that one almost continuous layer is simulated by the tight meshes of the grid with a mesh opening of a few tenths of millimeters, without it failing to rely however on the relatively high surface resistance of the known thin-film systems. Similarly, from a purely mechanical point of view, these grid structures are stronger than the known thin-film systems.

In the embodiment shown in FIG. 1, the lines 2 are produced as quarters of circles with a constantly changing curvature direction, where the junctions or nodes 3 are located exactly in the changes of direction. Via this, regular meshes appear that are delimited solely by the arc quarters.

Figure 2:
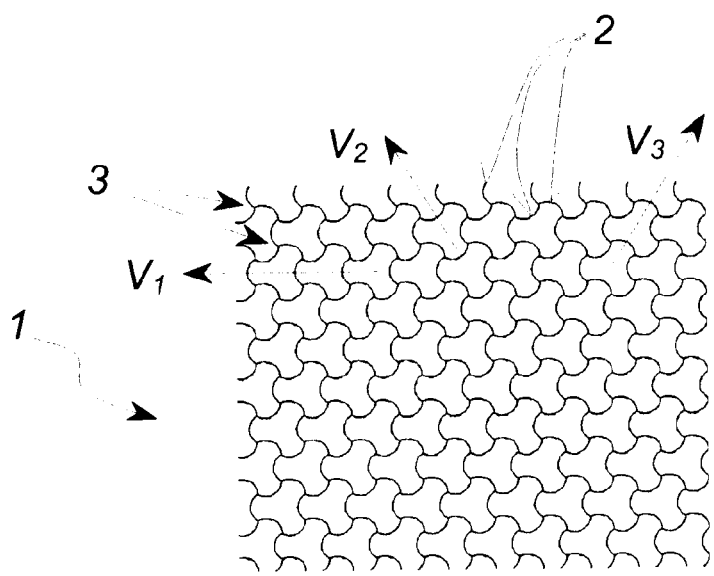

FIG. 2 shows a cutout from another embodiment of the transparent electrode 1 according to the invention. Here, the grid lines 2 are produced as thirds of a circle each time between two nodes 3, where each mesh is delimited by, respectively three lines curved toward the outside with respect to the center of the mesh and, respectively three lines curved toward the inside with respect to the center of the mesh, which alternately join up contiguously. On this basis, it results in the presence of three preferential directions represented by the arrows $V_1$, $V_2$ and $V_3$.

Figure 3:
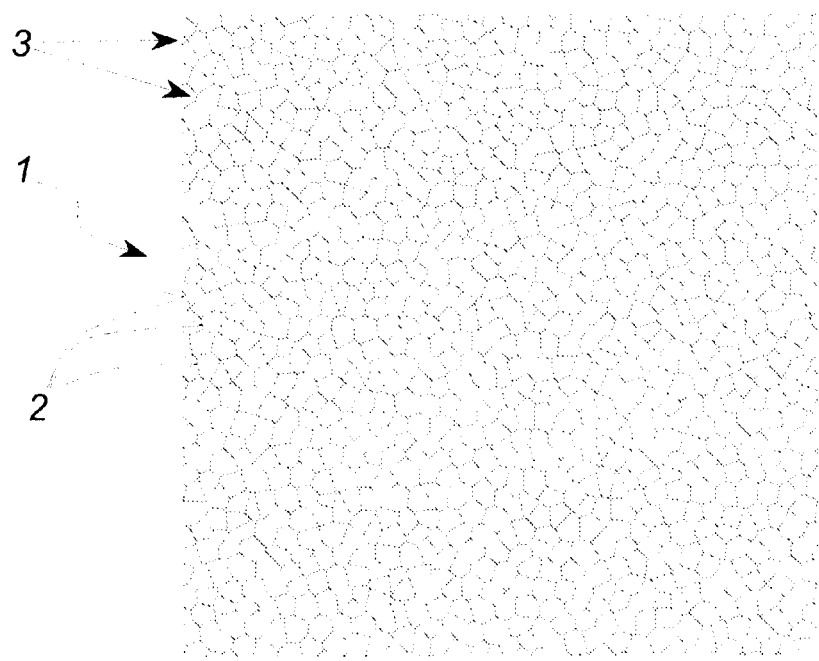

FIG. 3 shows another embodiment with no preferred direction, where again a mesh structure with a configuration having nodes with only three lines joining up per node is, on the other hand, produced. In this case, distinct conductive sections may however be so tight they can, without enlargement, be seen with the naked eye as nodes having four components. The achievement of the desired masking effect depends, although not systematically, on the fact that only three conductive lines join up at all the nodes; the main thing is that this is the case for a large proportion of the total number of nodes and that it results overall in no preferred direction.

Such a grid structure may be produced by resorting to a scatter using the following algorithm.

The coordinates of the mesh centers for the desired number are then chosen randomly. The linkage lines are determined from each mesh center toward the surrounding centers. The central perpendicular is drawn in relation to each linkage line, where the resulting lines are cut at the points of cross section with the neighboring central perpendiculars.

The achievement of this constructional requirement may however also be described by an analogy relating to a physical model which the above algorithm makes it possible to carry out.

The grid structure corresponds to the two-dimensional scatter structure which results when bubbles form at one starting point for a number of random points, which bubbles then develop in all directions equally, until they meet other neighboring bubbles. The arrangement of the separating walls between the bubbles then follows a random pattern from straight lines with no preferred direction.

Figure 4:
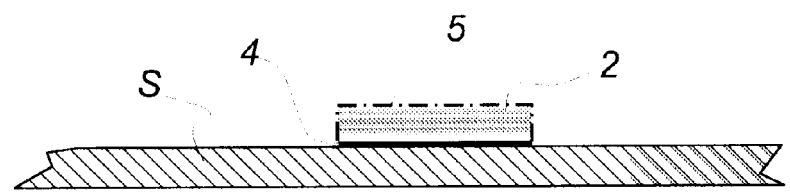

FIG. 4, finally, schematically represents a cross section with high enlargement, carried out through a substrate S with a line 2 of the grid structure arranged above. It is clearly seen that a colored layer with a color contrast 4 is arranged between the substrate S and the line 2. This colored layer is used, in particular, in an environment in which it is desired to particularly significantly reduce the troublesome optical impact with a view to masking the lines 2 and the points 3. For this reason, it is preferably located before the grid structure in the observation direction and will not in any case have scintillation effects.

In a vehicle windshield substrate, the colored layer 4 may optionally be closer for the visibility of the vehicle occupants and the driver than the grid structure. Of course, such a subjacent colored layer does not prevent the electrical contact of the metal grid structure.

Another colored layer 5 is indicated as a dotted line, which layer is also used for optical masking of the grid structure. When this colored layer 5 is not electrically conductive, it must of course be removed at least locally for the electrical contact of the grid structure, for example in the region of the electrical conductors (busbars) mentioned in the preamble.

The optical difference between the grid structures corresponding to a conventional embodiment (regular rectangles) and the grid structures according to the invention is illustrated by the diffraction patterns. A diffraction pattern is produced by the diffraction of the light which is emitted through a grid structure, at the edges of the line sections of various meshes (as at the edges of a slit in a surface which is otherwise opaque. A diffraction effect is created at each individual (straight) wire at the perpendicular of the direction of the wire. The diffraction patterns of all the wires are added in the light transmitted.

Figure 5A:
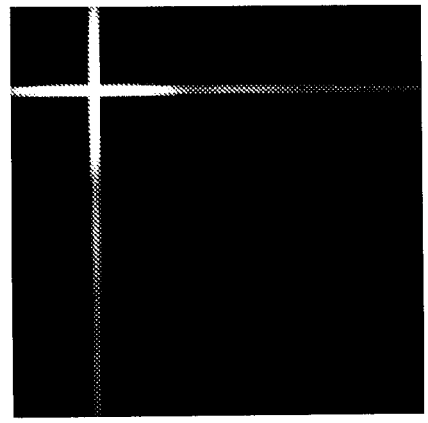
Figure 5B:
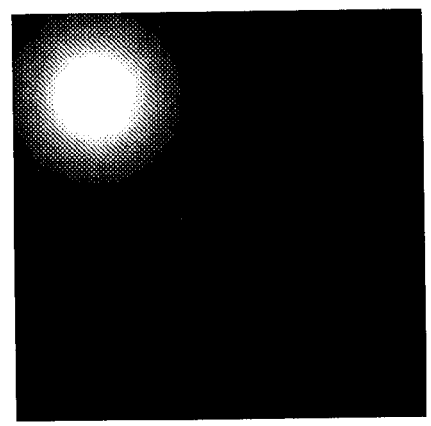
Figure 6:
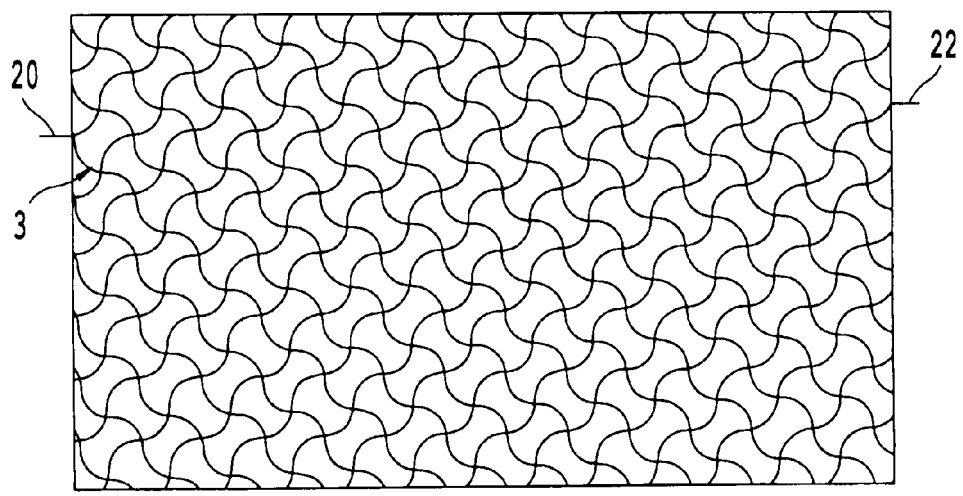
FIG. 6 illustrates a substrate including a grid according to the invention where the grid is connected to two external electrical connections.
Figure 7:
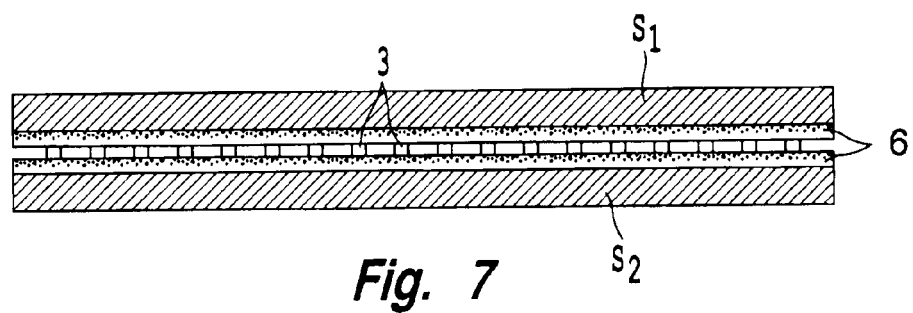
FIG. 7 illustrates a grid according to the invention included in a laminated substrate.
Figure 8:
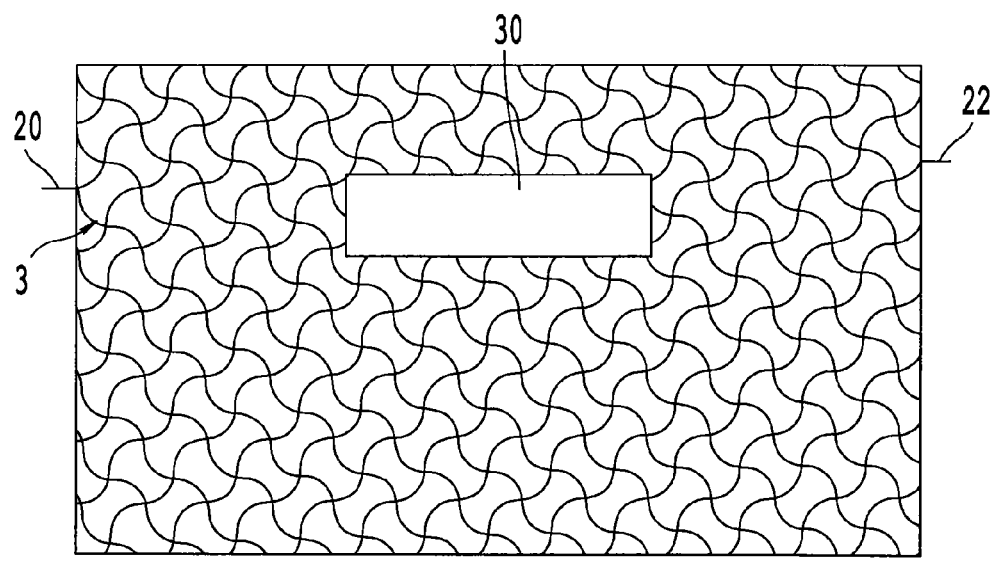
FIG. 8 illustrates a grid with a free space having a PET film deposited therein.

FIG. 5*a* shows a diffraction pattern for a grid embodiment with regular rectangular or square meshes, whereas FIG. 5*b* shows a diffraction pattern in the grid embodiment according to the invention. These diffraction patterns are derived from simulations of the direct observation of a white light source through the grid, however they represent exactly actual photographic shots of the base diffraction pattern. The difference between FIGS. 5*a* and 5*b* is clearly visible. In a conventional rectangular grid from FIG. 5*a*, a diffraction pattern is produced in the shape of a cross whose outline is clear. This is explained due to the diffraction of the light on the wires in only two directions that are precisely contiguous in a right angle, where each wire direction that is present creates, in a transparent view, a diffraction line (or transverse bar) which is perpendicular to it.

In comparison, the structure according to the invention favors the creation of a diffraction pattern in the shape of a circle (FIG. 5*b*), absorbed in the grid structures as in FIGS. 1 and 2.

Due to all the possible wire orientations which may appear in a regular (arc of a circle pattern) or random (scatter) distribution, the concentration of the diffraction intensities over only two bars and, consequently, the associated peaks of intensity are avoided.

The arc shape of the diffraction pattern which results explains the absence of these peaks of intensity, through which the grid structures according to the invention are less visible to the human eye in the transmitted light diffracted.

The invention claimed is:

1. A device comprising:
a rigid or flexible support substrate;
a transparent electrode provided on the rigid or flexible support substrate, the electrode including a grid network of electrically-conductive lines comprising nodes and links extending through a central viewing area of the substrate;
a transparent colored layer provided between the rigid or flexible support substrate and the transparent electrode to reduce optical impact of the transparent electrode; and
an electrochromic functional layer on a surface of the substrate, the electrode being in contact with the electrochromic functional layer,
wherein the lines joining up at each node are bent in a shape of an arc or in a wavy shape,
the grid network including three lines that join up at each node, wherein each of the three lines is curved in a shape of an arc, and
the lines of the grid network have a width between 5 and 20 µm, the lines of the grid network either always having a same width or locally having different widths.

2. The device as claimed in claim 1, wherein the grid network is without preferential direction in the nodes to which the three lines is connected.

3. The device as claimed in claim 1, wherein the grid network is provided with at least one adhesive layer for surface-bonding with the substrate which is a rigid substrate or a window substrate.

4. The device as claimed in claim 1, wherein a second colored layer, configured to optically mask the grid network, is placed on surfaces at a distance from the substrate, lines, and points of the grid network.

5. The device as claimed in claim 1, wherein the grid network is manufactured by an optical lithographic process.

6. The device as claimed in claim 1, wherein the grid network is manufactured from thin metal wires.

7. The device as claimed in claim 1, further comprising at least one external electrical connection, with two external connections opposite one another on both sides of a surface extension of the electrode.

8. The device as claimed in claim 1, wherein at least one part of the substrate surface is free from lines and nodes of the grid network, or free from a border region and/or a region through which high-frequency electromagnetic waves are designed to pass.

9. The device as claimed in claim 8, wherein a PET film having a same thickness as the lines is located in the at least one part of the substrate surface free from lines and nodes of the grid network.

10. The device as claimed in claim 1, wherein a pattern of the grid creates a diffraction pattern in a shape of a circle.

11. The device as claimed in claim 1, wherein the transparent colored layer is a lacquer layer.

12. The device as claimed in claim 1, wherein the electrode is electrically connected to the electrochromic functional layer to provide power to the electrochromic functional layer.

13. The device as claimed in claim 6, wherein the thin metal wires are thin copper wires.

* * * * *